United States Patent
Grenz et al.

[11] Patent Number: 5,857,370
[45] Date of Patent: Jan. 12, 1999

[54] METHOD OF AND APPARATUS FOR THE TRIMMING OF LEADING AND/OR END PORTIONS OF ROLLED PRODUCTS

[75] Inventors: Günter Grenz, Meerbusch; Nurettin Oeztuerk, Dormagen, both of Germany

[73] Assignee: SMS Schloemann-Siemag AG, Dusseldorf, Germany

[21] Appl. No.: 823,060

[22] Filed: Mar. 21, 1997

[30] Foreign Application Priority Data

Mar. 22, 1996 [DE] Germany .......................... 196 11 302

[51] Int. Cl.⁶ .......................................................... B21B 1/00
[52] U.S. Cl. ............................................................. 72/203
[58] Field of Search ................................. 72/15.3, 15.4, 72/16.7, 18.5, 17.2, 18.9, 20.1, 203, 204, 324, 326, 331, 338; 83/303, 306, 307, 105, 106, 107, 439

[56] References Cited

U.S. PATENT DOCUMENTS

| | | | |
|---|---|---|---|
| 2,588,581 | 3/1952 | Sieger | 83/303 |
| 4,176,535 | 12/1979 | Elsner et al. | 72/203 |
| 4,627,320 | 12/1986 | Fuccaro | 83/303 |
| 4,966,060 | 10/1990 | Poloni | 83/306 |

FOREIGN PATENT DOCUMENTS

| | | |
|---|---|---|
| 0 618 033 A1 | 10/1994 | European Pat. Off. . |
| 29 00 013 | 7/1980 | Germany . |

*Primary Examiner*—Joseph J. Hail, III
*Assistant Examiner*—Rodney Butter
*Attorney, Agent, or Firm*—Herbert Dubno

[57] ABSTRACT

A method of and an apparatus for the cropping of leading or trailing end portions of rolled workpieces in which downstream of the rotary shear, a diverter is provided and upstream of the shear there is a rocker guiding the workpiece to the shear and having a cardan type articulation allowing pivotal movement of the rocker about horizontal and vertical axes selectively.

20 Claims, 6 Drawing Sheets

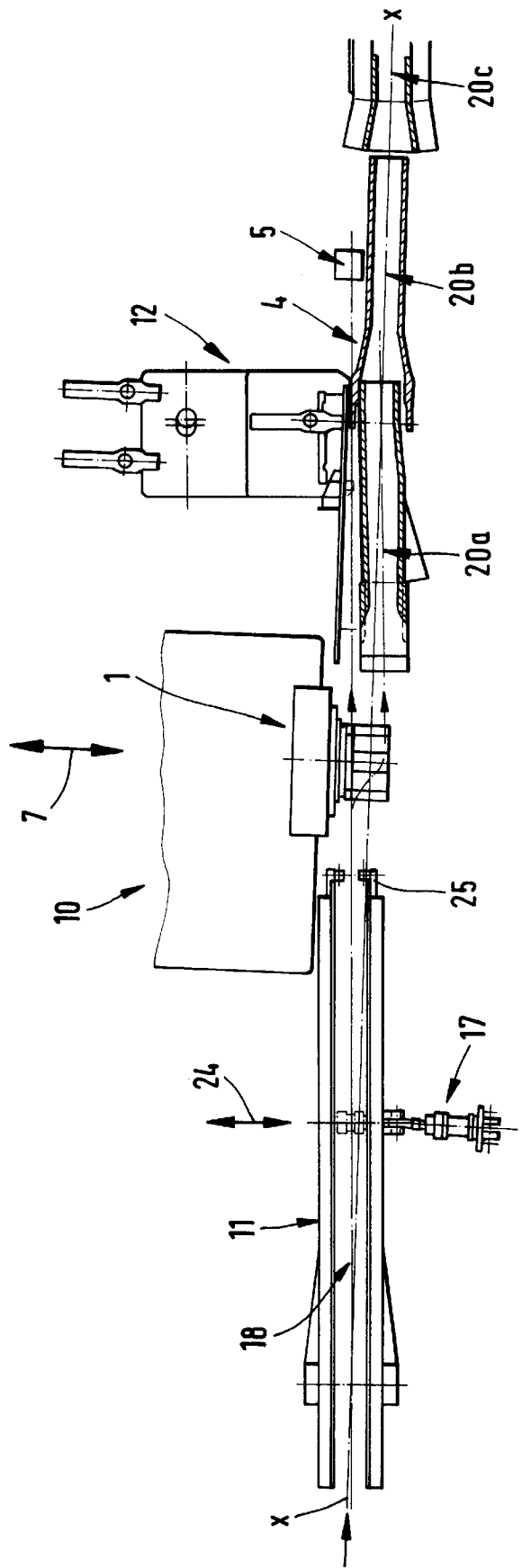

METHOD OF AND APPARATUS FOR THE TRIMMING OF LEADING AND/OR END PORTIONS OF ROLLED PRODUCTS

FIELD OF THE INVENTION

Our present invention relates to a method of and an apparatus for the cutting off and removal of leading and/or trailing cropped portions of travelling rolled products utilizing a rotating blade system or a parallel edge cutting system forming a shear and having lower blades and upper blades respectively leading or trailing one another as these blades are rotated about respective axes.

BACKGROUND OF THE INVENTION

For the cropping of leading or trailing end portions of rolled steel and other metal products, difficulties have been encountered heretofore. It will be understood, that whenever we refer to cropping here, we mean to refer to the cutting off of a leading portion and/or a trailing portion to remove defective parts of the rolled article, to cut the rolled article to size, to remove samples of the rolled article for analysis, or for any other reason.

One of the problems hereto encountered is the ability to effect cropping at leading and/or trailing ends selectively for rolled products of different diameters and the need to operate at high speeds so as not to impede the rolling process since the cropping apparatus is commonly provided along the rolling line. The rolled products may be wire, rod, bars and any of a variety of structural shapes or properties. Cropping units can be provided on any of the rolling lines for fabricating any of these products.

In the past it was found to be difficult to carry out cropping on the fly and even the removal of the cropped portions frequently posed a problem.

OBJECTS OF THE INVENTION

It is, therefore, the principal object of the present invention to provide an improved and highly versatile method of and apparatus for the cropping of rolled workpieces which can be used for leading end cropping, trailing end cropping or both, on the fly utilizing static units along the path of the workpieces upstream and downstream of the shear.

Another object of the invention is to provide a method of and an apparatus for the cropping of workpieces which avoids drawbacks of earlier systems.

SUMMARY OF THE INVENTION

These objects are attained, in accordance with the invention in a method off cropping ends (i.e. the leading end, the trailing end, or both) of elongated longitudinally displaced travelling rolled metal workpiece, particularly, rods, bars and structural shapes of any cross section, which comprises the steps of:

(a) guiding successive elongated longitudinally displaced traveling rolled metal workpieces along a roll line toward a shear along a rocker upstream of the shear and swingable about at least one axis to deflect the workpieces selectively onto a predetermined path out of the roll line;

(b) at the shear cropping at least one end portion of each of the workpieces to sever the respective end portion from a body of the respective workpiece; and (c) downstream of the shear intercepting the end portion with a diverter diverting the end portion from the line while lifting the body of the respective workpiece over the diverter back along the line.

The apparatus for this purpose can comprise:

a rolling line along which successive elongated longitudinally displaced travelling rolled metal workpieces are guided;

a shear along the line for cropping selectively leading ends and trailing ends of the workpieces;

a rocker along the line upstream of the shear and provided with a cardan joint defining a pivot in a horizontal plane and a pivot in a vertical plane for the rocker;

a diverter downstream of the shear and formed with a separating wedge;

at least one position detector for producing signals representing a position of at least one of the shear and the rocker;

electronic control means responsive to the signals for operating the rocker and the shear for cropping at least one end of a workpiece displaced along the line; and means at least in part rendered effective by displacement of the rocker about one of the axes for removing a cropped end of a workpiece from the line.

It will be apparent that devices can be provided for signalling the position of the blades and that the function of the shear during start up and braking need not be of concern since the operation of the shear can be triggered in response to the position of the workpiece type. Furthermore, a blade geometry can be used which enables the lower blade to lift the newly formed leading tip of the workpiece above the diverter so that no separate mechanism is necessary to vary the direction and speed of the workpiece once the leading end, for example, has been cropped therefrom. Interruptions in the movement of the workpiece or other disturbances thereof can be completely avoided.

When reference is made here to a rotating blade system, we intend to so indicate a system in which the counteracting blade members are provided on arms so that the blades when they meet can shear the workpiece between them. When reference is made to a parallel edge arrangement, we intend to so indicate a pair of parallel blades on respective blade shafts which rotate in opposite senses and, at the shearing location, meet to sever the workpiece between them.

The rocker thus can be actuated selectively to, for example, deflect the leading end of an oncoming workpiece below the diverter wedge, whereupon the rocker can be raised immediately prior to the severing operation, the workpiece being lifted by the lower blade of the shear.

The rocker can also be swingable in the horizontal plane so that the point at which the trailing end can be severed can be positioned at the blade meeting location.

Whether the cropped portion falls downwardly through a scrap chute or is guided laterally to diverge from the rolling line along which the workpieces are advancing the cropped pieces can be collected and, if desired, fed to a rotary blade chopper for further subdivision thereof.

According to a feature of the invention the workpieces are small diameter rods from which leading ends are to be cropped, the rolling line lies in a horizontal plane and the rocker deflects a tip of each oncoming rod at a leading end thereof downwardly below a separating edge of the diverter. In this case, the method can comprise the steps of:

accelerating a blade carrier of the shear from a given starting position in synchronism with displacement of the rod past the shear, severing the respective leading end from each rod upon interception by the wedge of the respective tip, diverting each severed leading end downwardly into a scrap chute, raising the rocker to lift a newly formed tip of each rod above the wedge into the line, returning the blade carrier to the starting position, and lowering the rocker before the tip at a leading end of a following rod arrives at the rocker.

When the trailing ends of small diameter rods or wires are to be cropped, the method can comprise the steps of:

displacing a leading portion of each rod along the line, laterally swinging the rocker in the horizontal plane to displace a trailing portion of the respective rod out of the line to position a trailing end to be cropped from the respective rod at a meeting point of a pair of blades of the shear, thereupon operating the shear to sever the respective trailing end from each rod, and returning the rocker into the line for arrival of a following rod at the rocker.

When large diameter rods or rolled products are to be cropped at the leading ends, the invention can include the steps:

while maintaining the rocker in the horizontal plane, severing a leading end from a respective rod and allowing the severed leading end to fall freely into a scrap chute ahead of a separating wedge of the diverter, lifting a newly formed leading tip of the respective rod above the separating wedge with a lower blade of the shear, and thereafter passing the remainder of the respective rod over the separating wedge along the line.

For trailing ends in the case of larger diameter rods the method can comprise the steps of:

while maintaining the rocker in the horizontal plane, passing a leading end of a respective rod along the line over a separating wedge of the diverter, upon a predetermined residual length of the rod lying upstream of the shear, operating the shear to sever a trailing end from the rod and allowing the trailing end to fall freely into a scrap chute, and causing the portion of the rod ahead of the cropped trailing end to travel unbraked along the line.

The process of the invention has been found to be effective in the cropping, therefore, of leading ends and/or trailing ends, while the workpieces are traveling at high speed and to be applicable to cropping of wire, small steel sections and medium steel sections.

The diverter and its wedge can be stationary and need not have a facility enabling it to be mobile.

The blade geometry which has been found to be most effective is a blade geometry which has the trailing flank edge blade and the flank of the other blade, both coplanar and lying in a radial plane of the parallel blade edges when the blades meet to effect the severing operation. The two blades are preferably bevelled in opposite directions away from their cutting edges.

BRIEF DESCRIPTION OF THE DRAWING

The above and other objects, features, and advantages will become more readily apparent from the following description, reference being made to the accompanying drawing in which:

FIG. 2 is a plan view of the apparatus of FIG. 1, also in diagrammatic form;

SPECIFIC DESCRIPTION

Figure 1:
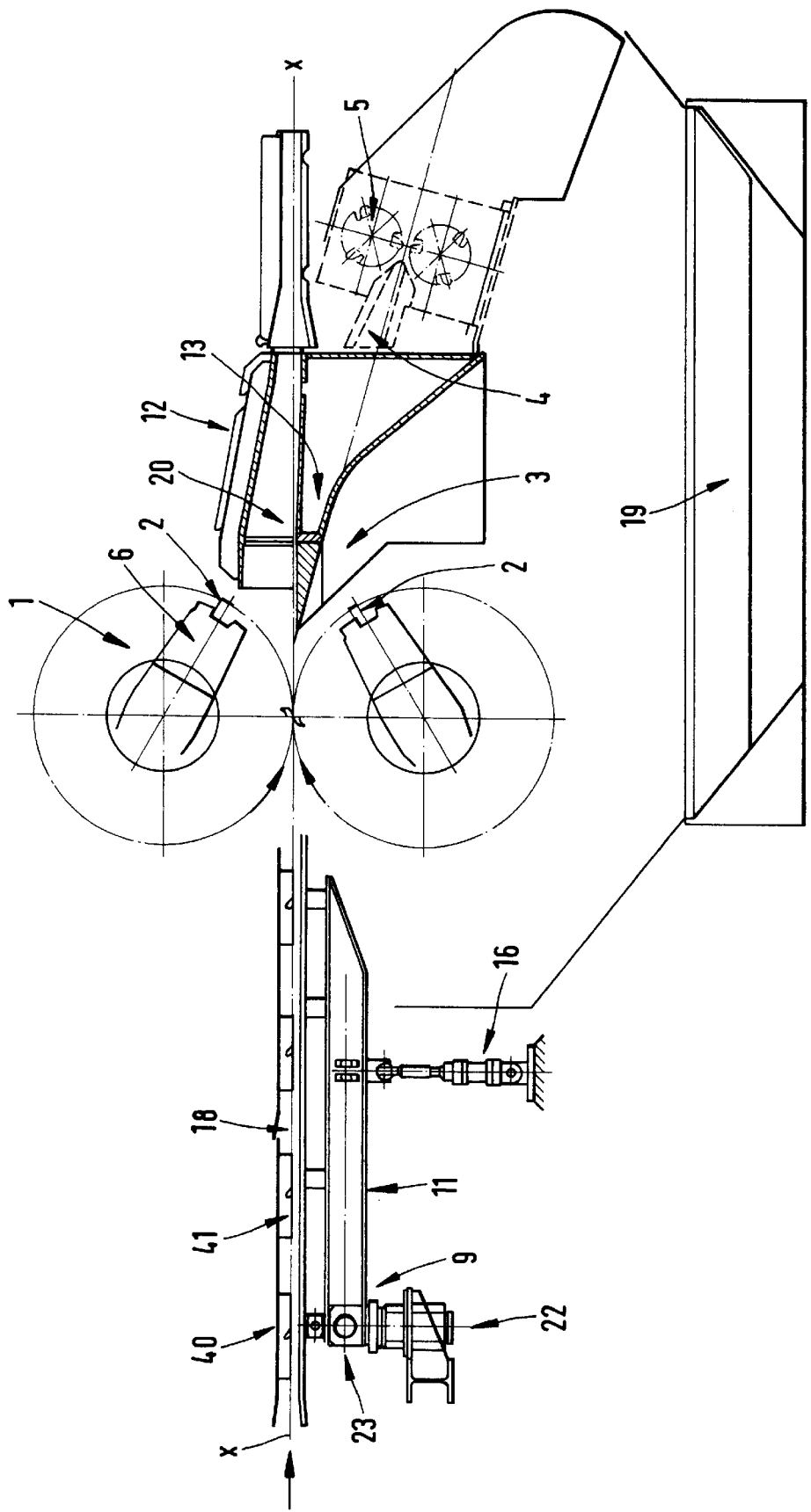
FIG. 1 is a highly diagrammatic view partially in section through a cropping apparatus located immediately downstream of a rolling apparatus along the rolling line.

FIG. 1 shows an apparatus for the cropping of leading or trailing end portions from travelling workpieces which can derive from a rolling line upstream of the apparatus, i.e. connected thereto at the left hand end thereof. As has previously been explained, the rolled products which can be cropped, can be rods, bars and structural shapes of the various cross sections which are produced in a rolling mill and which require leading or tailing end cropping for trimming of the workpieces or to remove samples of the product for metallurgical or other testing.

The apparatus comprises a shear represented generally at 10 and which can have a pair of cooperating blades which, in the embodiment of FIG. 1, form part of a rotating blade system in which the blades are carried on arms 6 and have orbits as shown in dot-dash lines. This type of rotating blade system can be distinguished from a parallel edge system as shown at 10 diagrammatically in the drawing and in which the blades 2a are fitted in rotating shafts and have the configuration shown for the blades 2b of the shear in FIG. 7b.

This configuration provides a lower blade whose trailing flank $2_1$ lies in a common radial plane $2_2$ with the leading flank $2_3$ of the upper blade 2b. The leading flank of the lower blade, shown at $2_4$ is parallel to the trailing flank $2_1$ and the trailing flank $2_5$ of the upper blade is parallel to the leading flank $2_3$ and bevelled surfaces $2_6$ and $2_7$ are provided on the lower and upper blades so that these bevelled surfaces, when used for cropping a trailing portion 35 serve to deflect the trailing portion downwardly (FIG. 7c) or are so oriented (FIG. 4a), when the leading end is cropped off as at 29 to lift the newly formed oncoming tip above the wedge 13 (see also FIG. 3b).

At the upstream side of the shear 1 or 10, a rocker 11 is provided which forms a U-section guide channel 18 with a cover 40 and lateral guide flanks 41 between which the traveling rolled workpieces are guided. At the upstream end, the rocker 11 is pivotally mounted in a cardan or universal type joint 9 defining a horizontal pivot axis 23 for the rocker and a vertical axis 22 about which the rocker can pivot.

For raising and lowering the downstream end of the rocker a lifting unit 16 is provided while an actuator 17 is provided to swing the rocker 11 about its vertical axis relative to the rolling line x—x as can be seen from the plan view of FIG. 2. The actuator 16 and 17 may both be hydraulic cylinder arrangements and can serve to displace the rocker 11 as shown by the arrows 26 and 27 from the actuator 16 in FIGS. 3a and 3b or as shown by the arrow 24 for the actuator 17 in FIG. 2.

The shear 1 with its rotating blade system 6 or with its parallel edge system 10 is followed by a diverter 12 with a separating wedge 13. Below the separating edge 13 there is provided a scrap chute 3 and above the wedge 13 is a guide passage 20 for the cropped rolled workpieces.

Figure 6A:
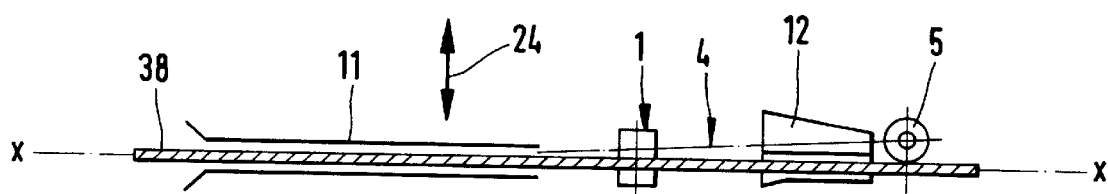
FIGS. 6a–6c show successive steps in a system for the cropping of trailing ends of a workpiece ravelling at high speed, illustrated in plan view.
Figure 6B:
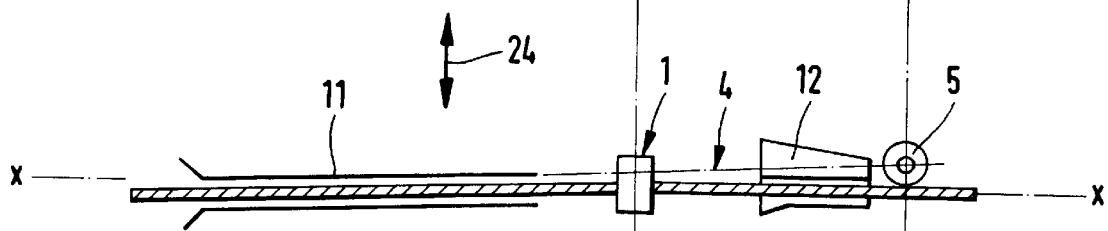
Figure 6C:
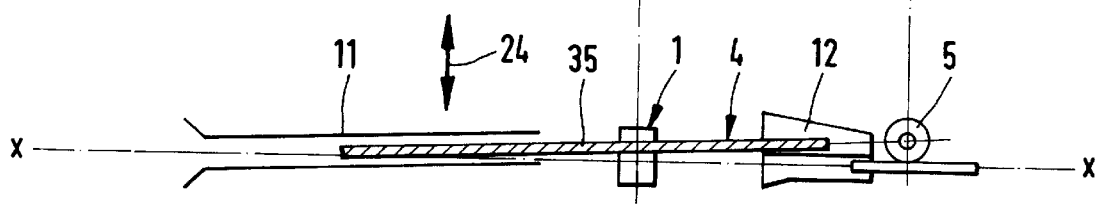

As shown by the plan views of FIGS. 6a–6c, laterally of the rolling line x—x, a trough 4 is provided at an end of which a chopping shear 5 can be provided for chopping up the cropped portions. In FIG. 1 a collecting bin 19 is provided for collecting the scrap and, of course, a chopper similar to the chopper 5 can be provided along the scrap chute 3 if desired.

As can be seen from FIG. 1 as well, the shear 1 or 10 can be provided with a position detector 50 which can provide an input representing the blade positions to an electronic controller or computer 51 which can also receive inputs from a speed sensor 52 monitoring the speed of the workpiece and a position sensor 53 detecting the oncoming workpiece. A further position sensor 54 can provide an input to the controller 51 representing the instantaneous position of the rocker 11 and outputs from the controller 51 are provided to operate the actuator 16 at 55, the actuator 17 at 56 and the blade drive at 57. The blade drive can include the electric motor 58 and, where the shear is a motorized shear, the control for it may be a start/stop control and the blades may have a plurality of drive motors mechanically synchronized via a common transmission. The various modes of operation of the apparatus have already been described.

FIG. 2 is a plan view of the cropping apparatus, showing the means for guiding away the cropped portions from above. The rocker 11 and the guide trough 18 integrated therewith is shown to be pivotally connected to the actuator 17 and to be provided at its downstream end with guide rolls 25 which have been found to be advantageous for rolled products, for example as composed of stainless steel. From FIG. 2 it will also be apparent that the shear 1 or 10 can be displaceable by a drive 58 in the direction of arrow 7 to allow the workpiece to bypass the blades or to be engaged thereby when cropping is to be effected. The shifting action is represented by dot-dash lines and it will be apparent that the drive 58 is also operated by the controller 51.

The drive 58 can bring either the parallel edge system or the swingable blade system into play if both are provided. For example, for the cropping of round workpieces of small diameter or for the cropping of flat sections, preferably the swinging blade system is used, whereas for the cropping of wound sections of larger diameter or thicker flat sections, a shear 10 with a parallel edge system can be employed.

For the shear 1 with a swinging blade system, a diverter 12 can be employed which has a long separating wedge 13 as shown in FIG. 1 and a scrap chute 3 lying therebelow or a lateral trough 4 with a chopper 5 downstream thereof as seen in FIGS. 6a–6c.

For the further transport of the rolled product after cropping of a trailing end 35, for example guide passages 20a–20c are provided (FIG. 2).

Figure 7A:
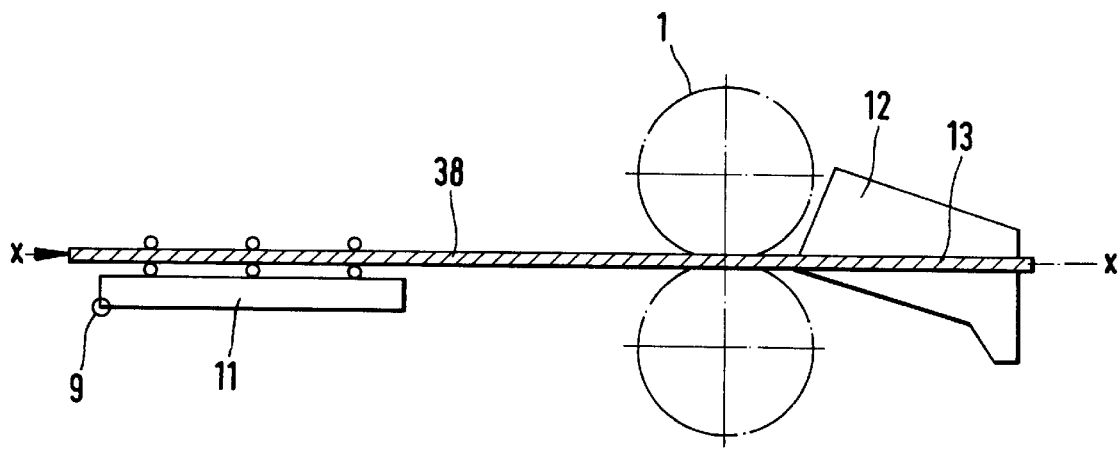
FIGS. 7a–7c are views corresponding to FIGS. 6a–6c but showing the apparatus in side view.
Figure 7B:
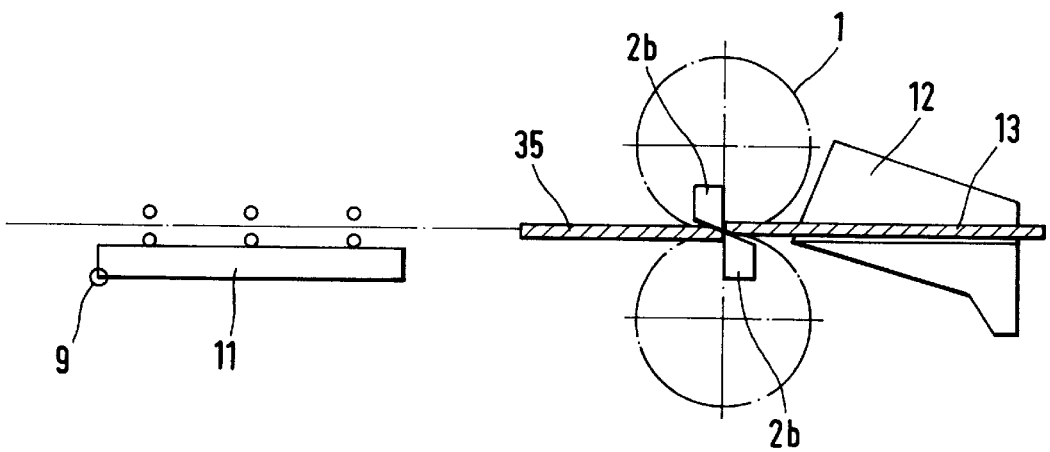
Figure 7C:
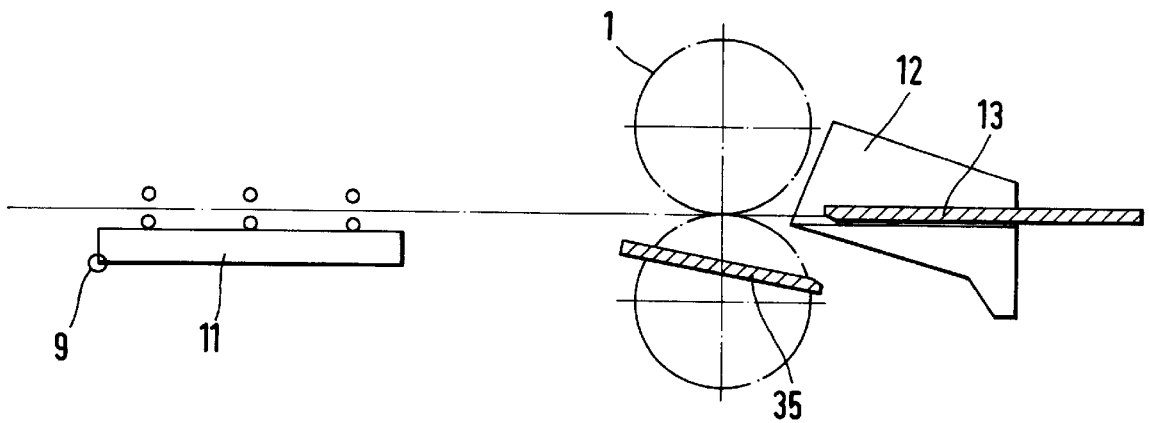

The function of the cropping apparatus in the severing of leading and/or trailing portions from the travelling workpieces and the diversion of the cropped portions is best understood with reference to FIGS. 3a–3c, FIGS. 4a, 4b and 5, or FIGS. 6a–6c together with FIGS. 7a through 7c.

Figure 3A:
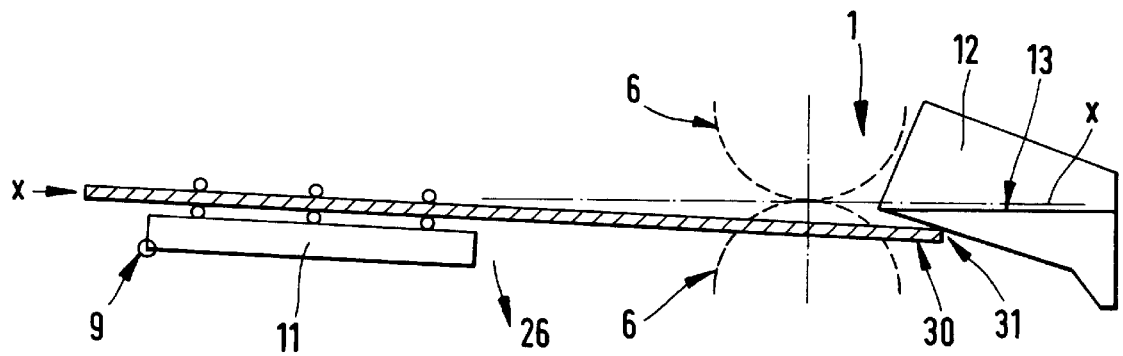
FIGS. 3a–3c illustrate in diagrammatic side view successive steps in a process for the cropping of leading ends or samples of leading ends of workpieces which are displaced at high speed along the path.
Figure 3B:
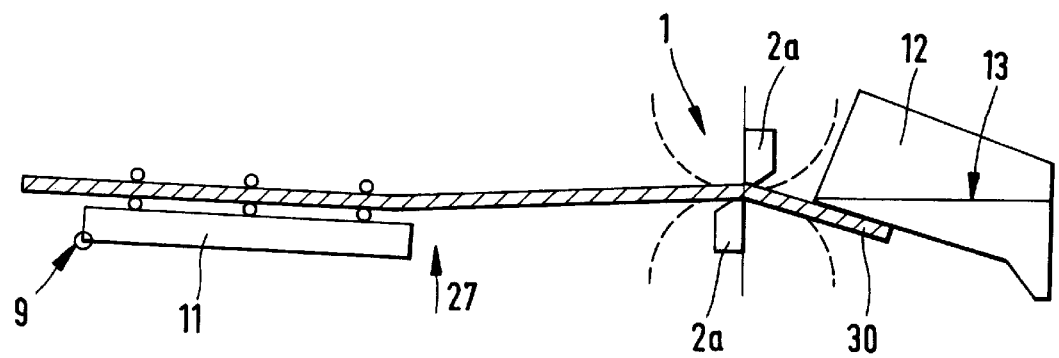
Figure 3C:
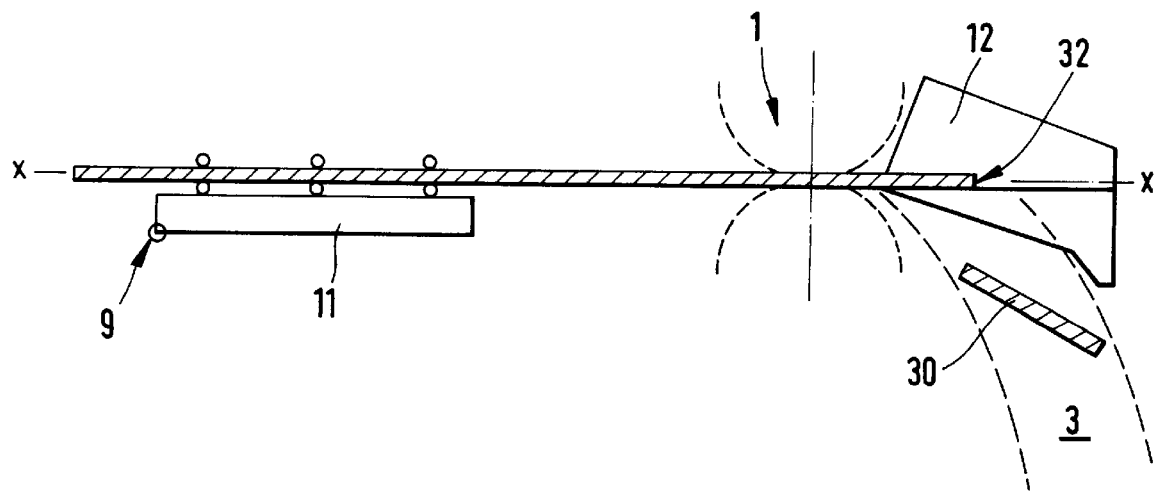

In the operating mode represented in FIGS. 3a–3c, a leading end or sample 30 of a rod-shaped workpiece of small diameter is cropped. For this purpose the rocker 11 is initially swung downwardly from the horizontal plane about its cardan joint 9 in the direction of arrow 26 so that the tip 31 at the leading end of the workpiece passes below the separating wedge 13 of the diverter 12. With synchronism of the movement of the workpiece with the shear via the sensors described, the blade carriers of the shear 1 can be rotatably accelerated from given starting positions and the leading end portion 30 can be cropped off at the meeting point of the other blades 2a as shown in FIG. 3b to thereby sever the leading end portion at a given length thereof. The leading end portion 30 falls downwardly below into the scrap chute 3 and at the moment of severing, the rocker 11 is swung upwardly (arrow 27 in FIG. 3b) so that the newly formed tip 32 will pass over the separating wedge 13 back along the rolling line x—x and the shear will return to its original position (FIG. 3c).

Before the feed of the next workpiece from a supply, the rocker 11 is again swung downwardly (FIG. 3a).

FIGS. 6a–6c and 7a–7c illustrate the severing of a trailing end portion 35 from the rod like workpieces 38, the operation being shown in plan view in FIGS. 6a–6c and in side view in FIG. 7a–7c. The rocker 11 can be swung in the horizontal plane as represented by the arrow 24 (FIGS. 6a–6c) like a switch track to the blades of the configuration shown at FIG. 2b for the cropping of the trailing end. With the position sensor and the controls described, when the length of the end portion to be cropped extends from the meeting point of the two blades 2b rearwardly, the blades are actuated and the cropped portion pressed downwardly by the upper blade (FIG. 7c) or guided through the channel 4 to the chopper 5, the rocker 11 being realigned with the rolling line x—x for the arrival of the next workpiece.

Figure 4A:
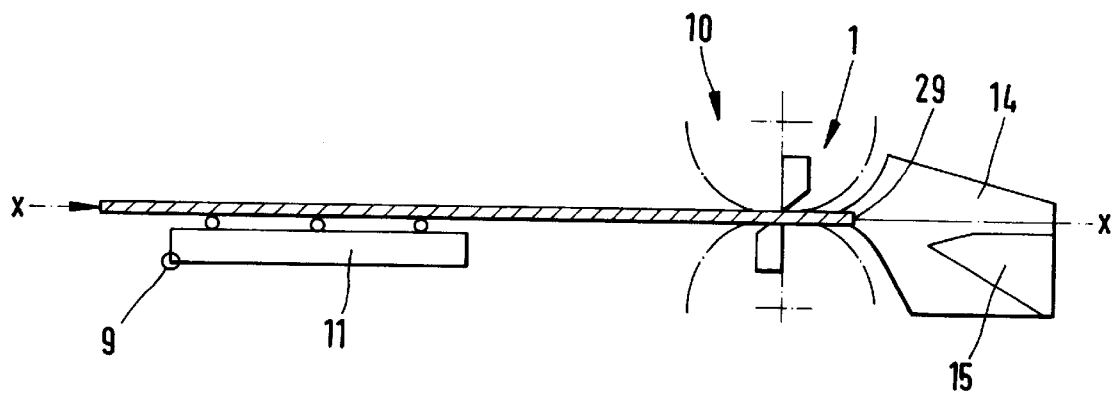
FIGS. 4a and 4b show in diagrammatic side views successive steps in the cropping of leading ends of lower speed workpieces.
Figure 4B:
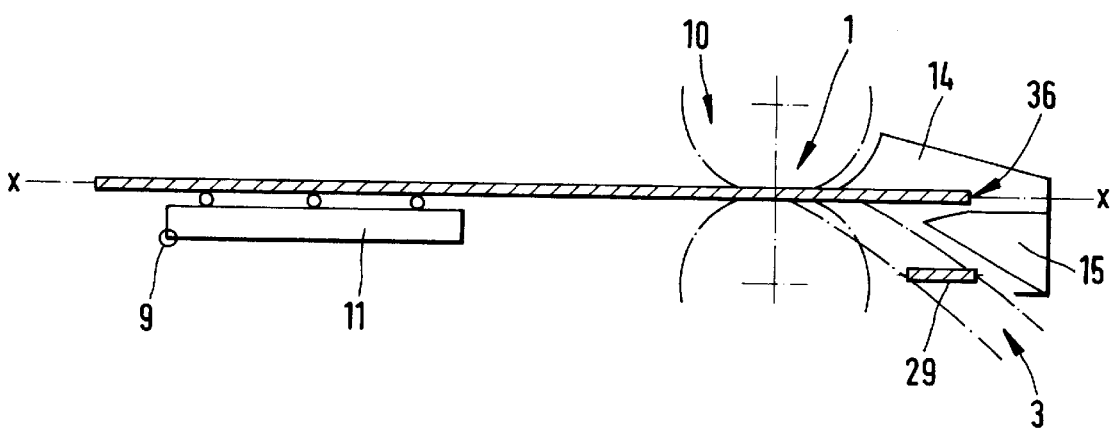

The cropping of a leading end portion 29 from a workpiece of larger diameter has been illustrated in FIGS. 4a and 4b. In this case, the rocker 11 remains in its horizontal position in the rolling line x—x and the parallel shear 10 severs the leading end portion 29 immediately upstream of a diverter 14 having a shorter separating wedge 15 so that the cropped portion falls, as seen in FIG. 4b into the scrap chute while the newly formed leading end or tip 36 is lifted slightly above the wedge 15 of the diverter 14 by the lower blade so that the balance of the workpiece continues to travel along the line x—x.

Figure 5:
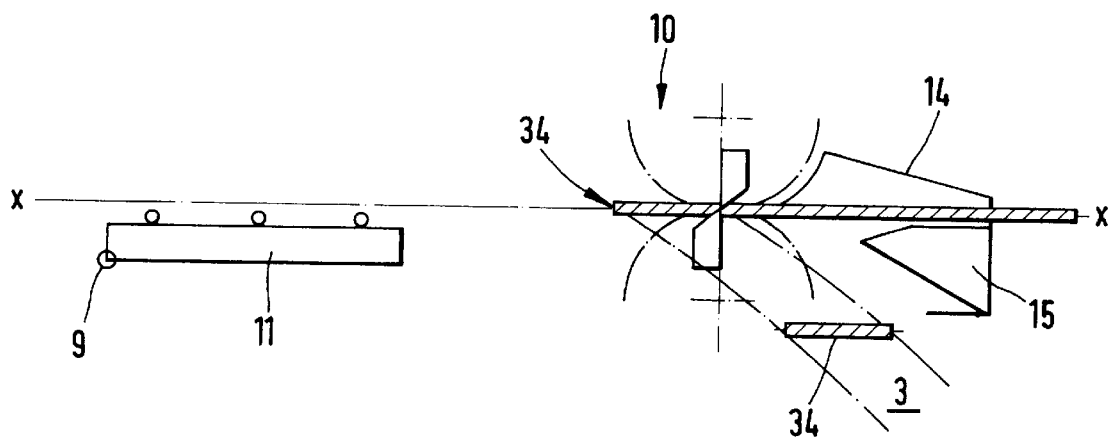
FIG. 5 is a diagrammatic side view illustrating the application of the invention to the cropping of a trailing end portion of a low speed workpiece in a diagrammatic side view.

The severing and removal of the trailing end portion 34 of a rod shaped workpiece of large diameter has been represented in FIG. 5. Here again the rocker 11 remains in its horizontal or starter position in the rolling line x—x and the bar or rod is passed above the separating wedge 15. When a predetermined residual length of the workpiece remains relative to the meeting point of the blades, the trailing end portion 34 is cropped off (FIG. 5) and this portion 34 falls freely through the chute 3 while the remainder of the bar travels unbraked over the separating wedge 15.

We claim:

1. A method of cropping ends of elongated longitudinally displaced traveling rolled metal workpieces, comprising the steps of:

(a) guiding successive elongated longitudinally displaced traveling rolled metal workpieces along a roll line toward a shear along a rocker upstream of said shear, said rocker having a cardan joint at an upper end thereof and being provided with means for raising and lowering a downstream end of the rocker about a horizontal axis with means for swinging said rocker about a vertical axis;

(b) swinging said rocker about at least one of said axes to deflect said workpieces selectively onto a predetermined path out of said roll line in response to measurement of displacement of said workpiece;

(c) at said shear, cropping at least one end portion of each of said workpieces to sever the respective end portion from a body of the respective workpiece and in response to the measurement of displacement of said workpieces; and (d) downstream of said shear intercepting said end portion with a fixed diverter diverting said end portion from said line while lifting the body of the respective workpiece over said diverter back along said line.

2. The method defined in claim 1, further comprising the step of guiding said end portions upon cropping from said workpieces along a scrap chute.

3. The method defined in claim 1, further comprising the step of chopping up said end portions upon diversion thereof from said line.

4. The method defined in claim 1 wherein said workpieces are small diameter rods from which leading ends are to be cropped, said line lying in a horizontal plane, said rocker deflecting a tip of each rod at a leading end thereof downwardly below a separating wedge of said diverter, said method further comprising the steps of:

accelerating a blade carrier of said shear from a given starting position in synchronism with displacement of the rod past the shear, severing the respective leading end from each rod upon interception by said wedge of the respective tip, diverting each severed leading end downwardly into a scrap chute, raising said rocker to lift a newly formed tip of each rod above said wedge into said line, returning said blade carrier to said starting position, and lowering said rocker before the tip at a leading end of a following rod arrives at the rocker.

5. The method defined in claim 1 wherein said workpieces are small diameter rods from which trailing ends are to be cropped, said line lying in a horizontal plane, said method comprising the steps of:

displacing a leading portion of each rod along said line, laterally swinging said rocker in said horizontal plane to displace a trailing portion of the respective rod out of said line to position a trailing end to be cropped from the respective rod at a meeting point of a pair of blades of said shear, thereupon operating said shear to sever the respective trailing end from each rod, and returning said rocker into said line for arrival of a following rod at said rocker.

6. The method defined in claim 1 wherein said workpieces are large diameter rods from which leading ends are to be cropped, said line lying in a horizontal plane, said method comprising the steps of:

while maintaining said rocker in said horizontal plane, severing a leading end from a respective rod and allowing the severed leading end to fall freely into a scrap chute ahead of a separating wedge of said diverter, lifting a newly formed leading tip of the respective rod above said separating wedge with a lower blade of said shear, and thereafter passing the remainder of the respective rod over said separating wedge along said line.

7. The method defined in claim 1 wherein said workpieces are large diameter rods from which trailing ends are to be cropped, said line lying in a horizontal plane, said method comprising the steps of:

while maintaining said rocker in said horizontal plane, passing a leading end of a respective rod along said line over a separating wedge of said diverter, upon a predetermined residual length of the rod lying upstream of said shear, operating said shear to sever a trailing end from said rod and allowing said trailing end to fall freely into a scrap chute, and causing the portion of said rod ahead of the cropped trailing end to travel unbraked along said line.

8. The method defined in claim 1 wherein the workpieces are rolled metal structural shapes displaced at high velocity, said line lying in a horizontal plane, said method comprising the steps of:

lowering said rocker to cause a tip at a leading end of one of said shapes to engage below a separate wedge of said diverter, rotatably accelerating the blade carriers of said shear from a starting position in synchronism with the advance of one of said structural shapes;

severing a leading end of said one of said structural shapes at said shear upon the passage of a predetermined length of said structural shape beyond a contact point of said blades whereby the severed leading end falls into a scrap chute, directly immediately prior to the severing of said leading end from said one of said structural shapes, raising said rocker whereby a newly formed tip of said one of said structural shapes is lifted by a lower one of said blades over said wedge and rotating said blades to their starting position; and thereafter lowering the rocker of the tip of a leading end of a structural shape arrives at the rocker.

9. The method defined in claim 1 for cropping of a leading end of a rolled structural shape displaced at a low speed, said method comprising the steps of providing said diverter with a foreshortened separating wedge and maintaining said rocker in a horizontal plane while one of said structural shapes passes over said rocker and past said shear, upon attainment of a predetermined length of a respective structural shape relative to said shear, separating a leading end with said shear from said one of said structural shapes and allowing said separated leading end to free fall into a scrap chute, causing the remainder of said one of said structural shapes to travel unblocked along said line.

10. The method defined in claim 1, further comprising generating signal representing movement of at least one of said rocker and said shear and providing speed and position signals for at least one of a leading and a trailing tip of a workpiece to be cropped and controlling the movement of said shear and said rocker in response to said signals.

11. An apparatus for cropping ends of elongated longitudinally spaced travelled rolled metal workpieces comprising:

a rolling line along which successive elongated longitudinally displaced travelling rolled metal workpieces are guided;

a shear along said line for cropping selectively leading ends and trailing ends of said workpieces;

a rocker along said line upstream of said shear and provided with a cardan joint at an upstream end of said rocker defining a pivot about a horizontal axis and about a vertical axis for said rocker;

a diverter downstream of said shear and formed with a separating wedge;

at least one position detector for producing signals representing a position of at least one of said shear and said rocker;

electronic control means responsive to said signals for operating said rocker and said shear for cropping at least one end of a workpiece displaced along said line; and means at least in part rendered effective by displacement of said rocker about one of said axes for removing a cropped end of a workpiece from said line.

12. The apparatus defined in claim 11 wherein said shear is a rotating blade system.

13. The apparatus defined in claim 11 wherein said shear is a parallel-edge cutting system.

14. The apparatus defined in claim 11 wherein said means for removing cropped ends includes a scrap chute for guiding said cropped ends away from said line.

15. The apparatus defined in claim 11 wherein said means for removing includes a chopper for chopping cropped ends removed from said line.

16. The apparatus defined in claim 11 further comprising means for shifting said shear transversely to said line.

17. The apparatus defined in claim 11 wherein said cardan joint is located at one end of said rocker, said rocker being provided with a lifting unit at an opposite end of said rocker for controlling inclination of said rocker in a vertical plane and an actuator acting on said rocker for laterally swinging said rocker relative to said line.

18. The apparatus defined in claim 11 wherein said shear is a motorized shear operable with a start/stop energization and provided with at least one electric motor.

19. The apparatus defined in claim 11 wherein the shear has a blade configuration with two bevelled blades having flanks lying in a common radial plane of two blade shafts carrying said blades with the bevels extending in opposite direction from said plane.

20. The apparatus defined in claim 15 wherein said means for removing includes a guide channel in a region of said diverter and forming a branch path laterally of said line.

* * * * *